(12) United States Patent
Chen et al.

(10) Patent No.: US 11,518,688 B2
(45) Date of Patent: Dec. 6, 2022

(54) ALL INORGANIC PEROVSKITE MATERIALS FOR SHORT WAVE IR DEVICES

(71) Applicants: HONDA MOTOR CO., LTD., Tokyo (JP); UTAH STATE UNIVERSITY, Logan, UT (US)

(72) Inventors: Gugang Chen, Powell, OH (US); Yi Rao, Logan, UT (US); Xia Li, Logan, UT (US)

(73) Assignees: HONDA MOTOR CO., LTD., Tokyo (JP); UTAH STATE UNIVERSITY, Logan, UT (US)

( * ) Notice: Subject to any disclaimer, the term of this patent is extended or adjusted under 35 U.S.C. 154(b) by 28 days.

(21) Appl. No.: 17/104,358

(22) Filed: Nov. 25, 2020

(65) Prior Publication Data

US 2021/0155496 A1   May 27, 2021

Related U.S. Application Data (60) Provisional application No. 62/941,378, filed on Nov. 27, 2019.

(51) Int. Cl.
*C01G 21/00* (2006.01)
*G02B 5/00* (2006.01)

(52) U.S. Cl.
CPC .......... *C01G 21/006* (2013.01); *G02B 5/003* (2013.01); *C01P 2002/34* (2013.01); *C01P 2002/85* (2013.01); *C01P 2004/03* (2013.01)

(58) Field of Classification Search
CPC .......................... C01P 2002/34; C01G 21/006
See application file for complete search history.

(56) References Cited

FOREIGN PATENT DOCUMENTS

| CN | 104465992 A |   | 3/2015 |   |
|---|---|---|---|---|
| CN | 106159087 A |   | 11/2016 |   |
| CN | 106745204 A | * | 5/2017 | ............ C01G 21/00 |
| CN | 107564978 A |   | 1/2018 |   |
| CN | 108232014 A |   | 6/2018 |   |
| CN | 108336230 A |   | 7/2018 |   |
| CN | 109312464 A |   | 2/2019 |   |
| CN | 109337674 A |   | 2/2019 |   |
| CN | 110127752 A |   | 8/2019 |   |
| CN | 110164998 A |   | 8/2019 |   |

OTHER PUBLICATIONS

Chen et al., "All-Vacuum-Deposited Stoichiometrically Balanced Inorganic Cesium Lead Halide Perovskite Solar Cells with Stabilized Efficiency Exceeding 11%", Adv. Mater., 2017, 29, 1605290.*

(Continued)

*Primary Examiner* — Khanh T Nguyen
(74) *Attorney, Agent, or Firm* — ArentFox Schiff LLP; Mark Duell (57) ABSTRACT

All inorganic perovskites for short-wave IR (SWIR) devices having improved chemical stability and long-term stability. Improved methods of making all inorganic perovskites for short-wave IR (SWIR) devices are also disclosed herein.

19 Claims, 6 Drawing Sheets

(56) References Cited

OTHER PUBLICATIONS

Chen, Chien-Yu, et al., "All-Vacuum-Deposited Stoichiometrically Balanced Inorganic Cesium Lead Halide Perovskite Solar Cells with Stabilized Efficiency Exceeding 11%", Advanced Materials, vol. 29, Issue 12, Abstract, Jan. 20, 2017. https://doi.org/10.1002/adma.201605290.

Kim, Yu Geun, et al. "Cesium iodide solar cells controlled by annealing temperature", Physcial Chemistry Chemical Physics, Issue 8, Abstract, 2017 http://doi.org/10.1039/C6CP08177K.

Notice of Reasons for Rejection issued by the Japanese Patent Office related to Japanese Patent Application No. 2020-196134, dated Nov. 16, 2021.

Communication dated Sep. 16, 2022, issued by the Chinese Patent Office in related Chinese Patent Application No. 202011366679.8.

* cited by examiner

ALL INORGANIC PEROVSKITE MATERIALS FOR SHORT WAVE IR DEVICES

CROSS-REFERENCE TO RELATED APPLICATIONS

This application claims priority to U.S. Provisional Application No. 62/941,378, filed Nov. 27, 2019, the disclosure of which is expressly incorporated herein by reference in its entirety.

JOINT RESEARCH AGREEMENT

The presently claimed invention was made by or on behalf of the below listed parties to a joint research agreement. The joint research agreement was in effect on or before the date the claimed invention was made, and the claimed invention was made as a result of activities undertaken within the scope of the joint research agreement. The parties to the joint research agreement are 1) Honda Research Institute USA, Inc.; and 2) Utah State University.

BACKGROUND

Sunlight is made up of many broadband energies from ultraviolet light and visible light to short-wave infrared (SWIR) light. Various wavelengths of SWIR can extend from 550 nm to 1.7 microns and up to 2.5 microns for SWIR imaging. Compared to visible light detectors, SWIR detectors can have a number of advantages in a variety of applications including electronic board fabrication, product inspection, identifying and sorting, surveillance, anti-counterfeiting, process quality control and much more. For example, when imaging with SWIR, water vapor, fog, and certain materials such as silicon can be transparent. Unlike Mid-Wave Infrared (MWIR) and Long-Wave Infrared (LWIR) light, which is emitted from an object, SWIR can be similar to visible light in that photons are reflected or absorbed by an object, providing a strong contrast needed for high resolution imaging. For detecting SWIR, quantum detectors can be based on various photon-absorbing semiconductor materials. These technologies can have tunable properties (high quantum efficiency, relatively low dark current, high uniformity, fast time response), but, for example, typical SWIR detectors are expensive. As a result, access to these types of technologies can be restricted to defense and scientific applications, such as astronomy. These limitations originate from the complex fabrication of InGaAs and various other materials. Thus, there is a need for production of lower cost and environmentally-friendly short-wave IR materials having unique light absorbance from the visible to SWIR.

SUMMARY

The present disclosure is directed to all-inorganic perovskites for short-wave IR devices having tunable absorbance and superior chemical and crystalline stability. In some embodiments, the materials disclosed herein have a broader absorbance from 1000 nm to 2800 nm than traditional SWIR materials such as InGaAs, HgCdTe and InSb. In some embodiments, the precursors for the SWIR materials disclosed herein are universal and inexpensive, unlike existing SWIR materials. The methods of making the SWIR materials disclosed herein are straightforward. The SWIR materials disclosed herein and the methods of making have broad applications, for example, in security, surveillance, military, machine vision, photovoltaic solar cells, medical treatments, spectroscopy detector, and thermography. Previous perovskites have poor chemical and crystalline stability, not to mention long term instability, and the fabrication procedures for traditional SWIR materials are complicated.

BRIEF DESCRIPTION OF THE DRAWINGS

FIG. 2 shows EDS (SEM-energy dispersive X-ray spectrometry) elemental mapping of the image of $CsPbI_3$ perovskite thin film on glass in FIG. 1. In FIG. 2, the elements are indicated as I (green), Cs (red) and Pb (yellow).

DETAILED DESCRIPTION

The present disclosure is directed to methods of making all-inorganic perovskites for short-wave IR devices. The all-inorganic perovskites disclosed herein have tunable absorbance and superior chemical and/or crystalline stability compared to previous organic and inorganic perovskite materials. The present disclosure is also directed to the perovskite materials disclosed herein, devices utilizing the materials, methods of using the materials, and capabilities enabled by the present disclosure.

In some embodiments, the methods for making all-inorganic perovskites can comprise preparation of a metal precursor solution. According to some aspects, the metal precursor solution contains a mixture of one or more monovalent metal salts and one or more bivalent metal salts. For example, CsI can be utilized as a monovalent metal salt, and Cs can be replaced by other monovalent, inorganic or organic metal cations. A non-limiting example of a bivalent metal salt is $PbI_2$, wherein lead (cation) can be replaced by any other bivalent metal. The example anion, I—, can be replaced by other monovalent nonmetals, and non-limiting examples of anions are Cl— and Br—.

According to some aspects, the metal precursor solution can be prepared by dissolving a monovalent metal salt and a bivalent metal salt in a molar ratio of 2:1, respectively, in a suitable solvent. A suitable solvent can be an organic solvent having a capability to dissolve the salts, and some non-limiting examples of solvents are DMSO (dimethyl sulfoxide) and DMF (dimethylformamide). According to some aspects, one or more stabilizers can optionally be dispersed or dissolved in the metal precursor solution in addition to the dissolved salts. A non-limiting example of a stabilizer is 1-(3-sulfopropyl) pyridinium hydroxide inner salt, which can be added at about a 0.8% weight ratio in proportion to the total weight of the monovalent metal salt and bivalent metal salt. In some embodiments, the solvent utilized can stabilize a perovskite structure. The metal precursor solution can be, for example, prepared at a temperature of about 20-80° C., optionally about 40-80° C., or optionally about 60-80° C.

The metal precursor solution, in some embodiments, can be heated after preparation to a temperature less than the boiling point of the organic solvent, optionally to a temperature from about 25-90° C., optionally to a temperature from about 40-90° C., or optionally to a temperature from about 60-80° C. The metal precursor solution can then be dispersed onto a suitable heated substrate. The substrate can be a flexible or inflexible material, for example, glass can be utilized or a flexible polymer can be utilized. The substrate can be heated to a temperature from about 40-300° C., optionally to a temperature from about 50-190° C., optionally to a temperature from about 80-190° C., and optionally to a temperature from about 100-190° C. In some embodiments, a substrate utilized can stabilize a perovskite structure subsequently formed on the substrate.

The metal precursor solution can be dispersed onto a substrate by any means known in the art to form a thin film of metal precursor solution on the substrate. One non-limiting example of dispersing is spin-coating, which comprises spinning the substrate at a suitable speed and dispersing the metal precursor solution onto the spinning substrate. For example, the metal precursor solution can form a thin film on a spinning substrate. The substrate can be spinning at a suitable speed to disperse the metal precursor solution (and form a thin film of metal precursor solution) but not at such an excessive speed to dislodge the metal precursor solution from the substrate. Non-limiting examples of spinning speeds are from about 500-3000 rpm, optionally from about 1000-2000 rpm, and optionally about 2000 rpm. It should be understood that the spinning speed can vary depending on, for example, the viscosity of the solvent(s) utilized in the metal precursor solution or the concentration of the metal precursor solution.

According to some aspects, after forming a thin film on a substrate, the dispersed metal precursor solution can be annealed upon the substrate. In some embodiments, a thin film of metal precursor solution is annealed on the substrate to form a perovskite material. According to some aspects, depending on the annealing conditions, and for example, the chemical composition of the metal precursor solution, the wavelength of maximum SWIR absorbance of the resulting perovskite material can change. Annealing can optionally be performed under vacuum conditions. Annealing temperature can be from about 40-300° C., optionally from about 100-300° C., optionally from about 100-200° C., and optionally from about 110-130° C. Annealing can be done for a suitable time and at a suitable temperature, to form a perovskite material on the substrate. Non-limiting examples of annealing times are from about 1-60 minutes, from about 5-45 minutes, from about 10-30 minutes, or from about 15-30 minutes. In some embodiments, higher annealing temperatures, different annealing conditions, or longer annealing times can form perovskite material with a higher wavelength of maximum SWIR absorbance.

In a non-limiting example, CsI and $PbI_2$ can be dissolved in DMF (dimethylformamide) in a molar ratio of 2:1, respectively, to form a metal precursor solution. The metal precursor solution can be heated to about 60-80° C. and spin-coated for about 20 seconds, to form a thin film, on a glass substrate, which is pre-heated at 40-110° C. and spinning at about 2000 rpm. The thin film can then be annealed at a temperature 40-300° C. for a suitable time to obtain a perovskite material film. Example 1, described below, provides an example of a specific embodiment.

Figure 1:
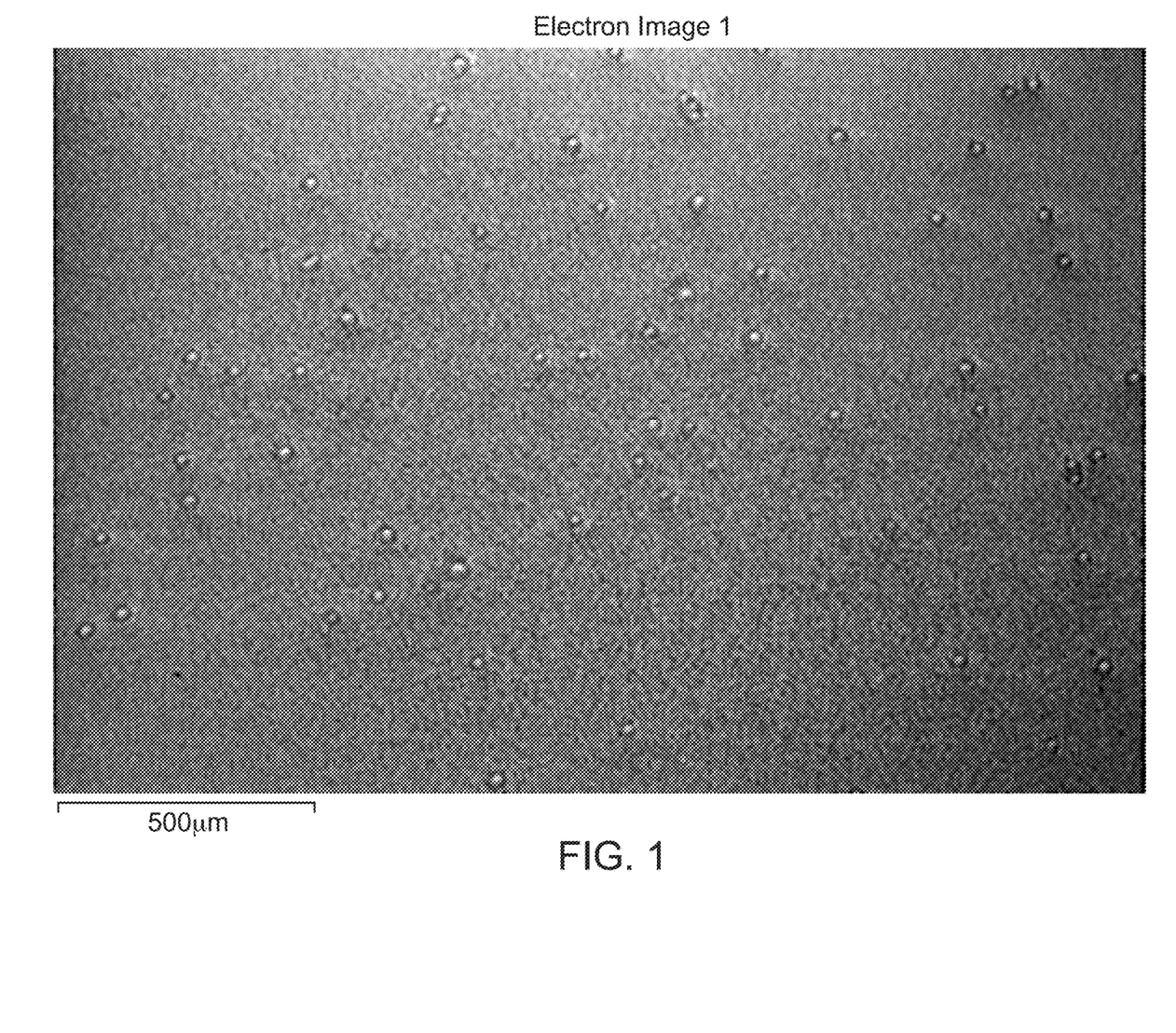
FIG. 1 shows a SEM (scanning electron microscope) image of $CsPbI_3$ perovskite thin film on glass utilizing a field emission SEM (FEI Quanta 450 FEG), according to some aspects of the present disclosure.
Figure 2:
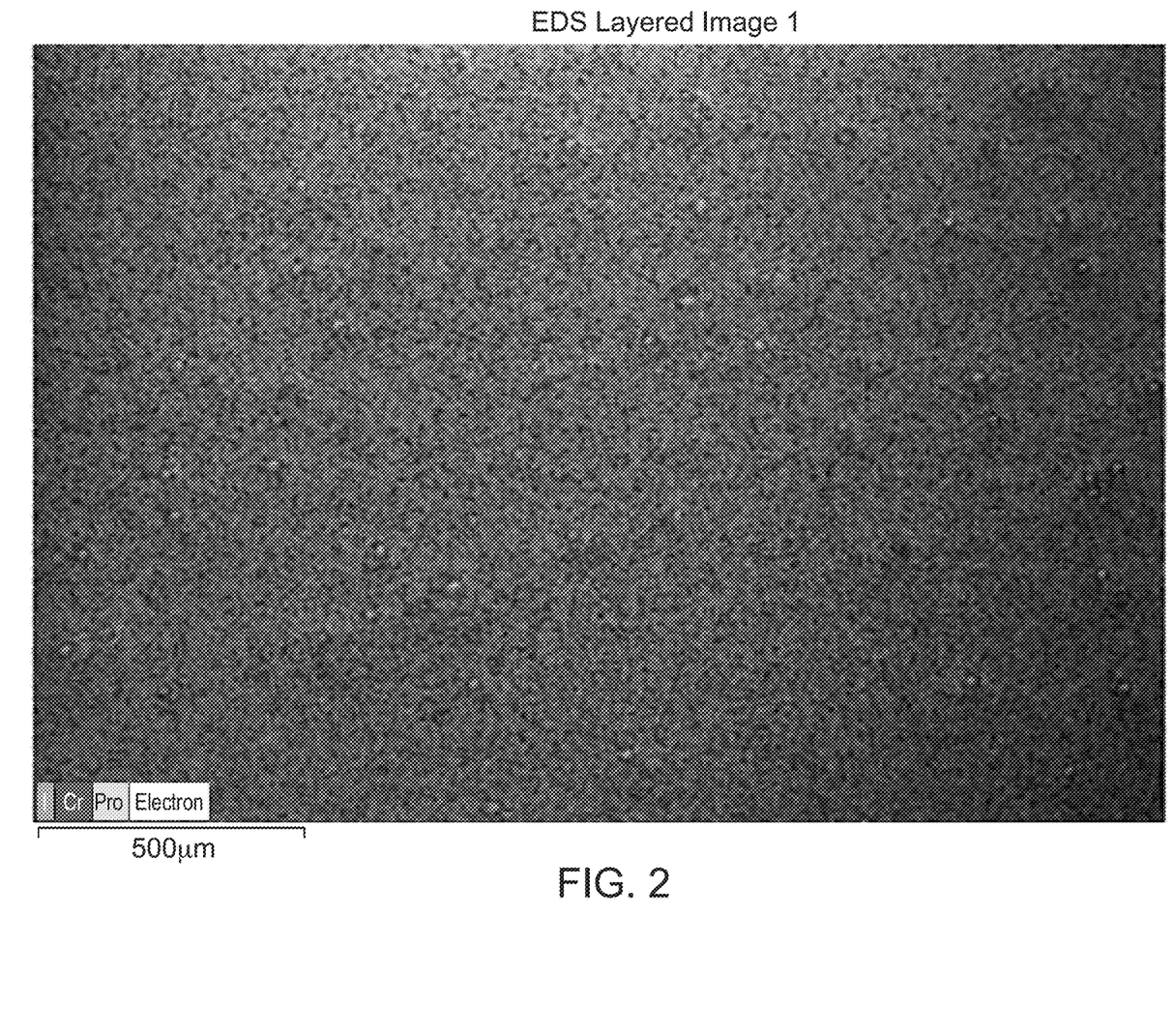
Figure 3:
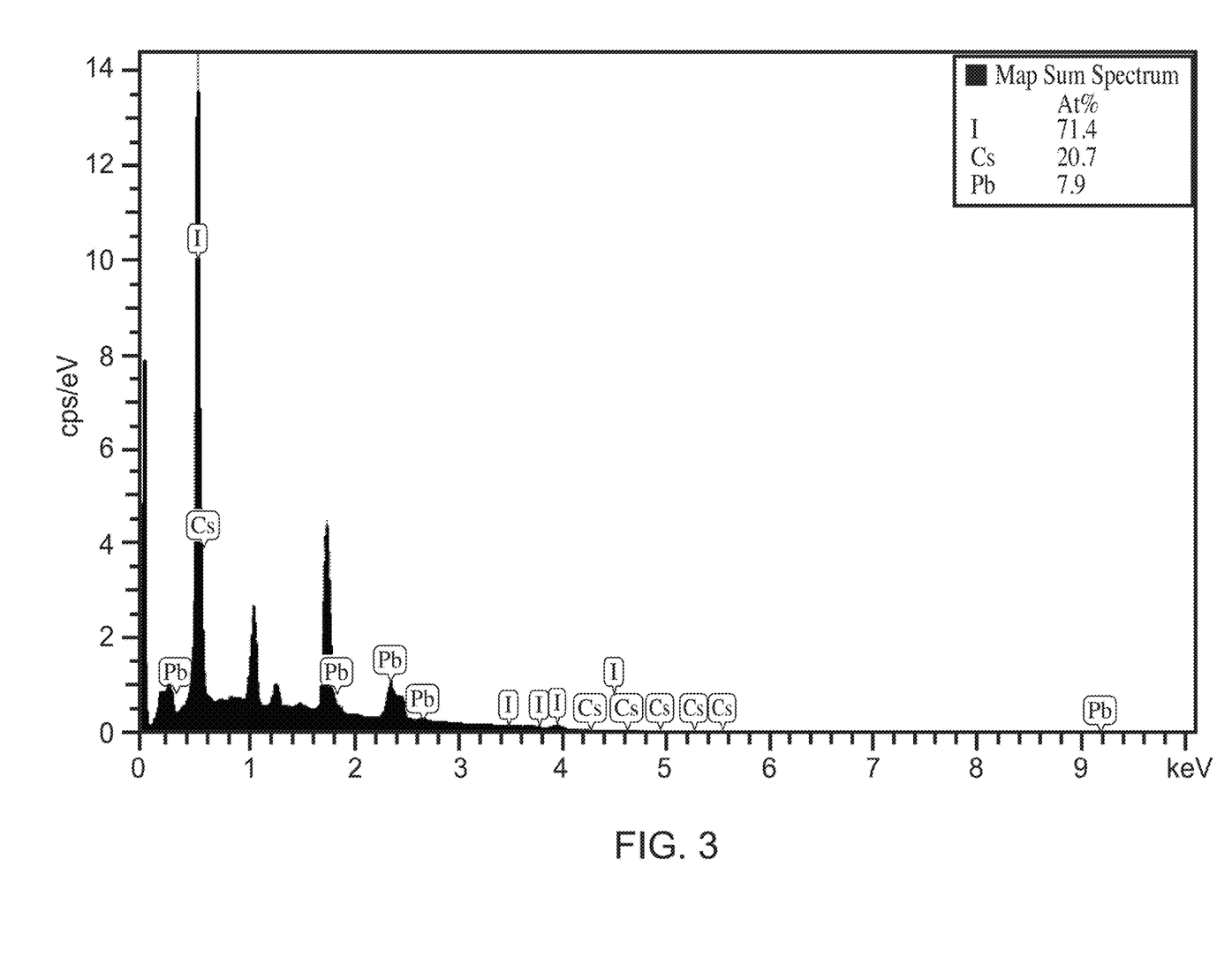
FIG. 3 shows chemical composition and atomic percentages (At %) of the thin film perovskite depicted in FIG. 2.

FIG. 1 shows the SEM (scanning electron microscope) image of a $CsPbI_3$ perovskite thin film on glass as prepared in Example 1. FIG. 2 shows EDS elemental mapping (SEM-energy dispersive X-ray spectrometry) of 1 (green), Cs(red) and Pb (yellow) of the perovskite shown in FIG. 1. The chemical composition and atomic percentages (At %) of the thin film are further shown in FIG. 3, wherein in terms of At %, Pb:Cs:I=7.9:20.7:71.4; thus, the ratio of these elements is consistent with that in the starting precursor solution.

Figure 4:
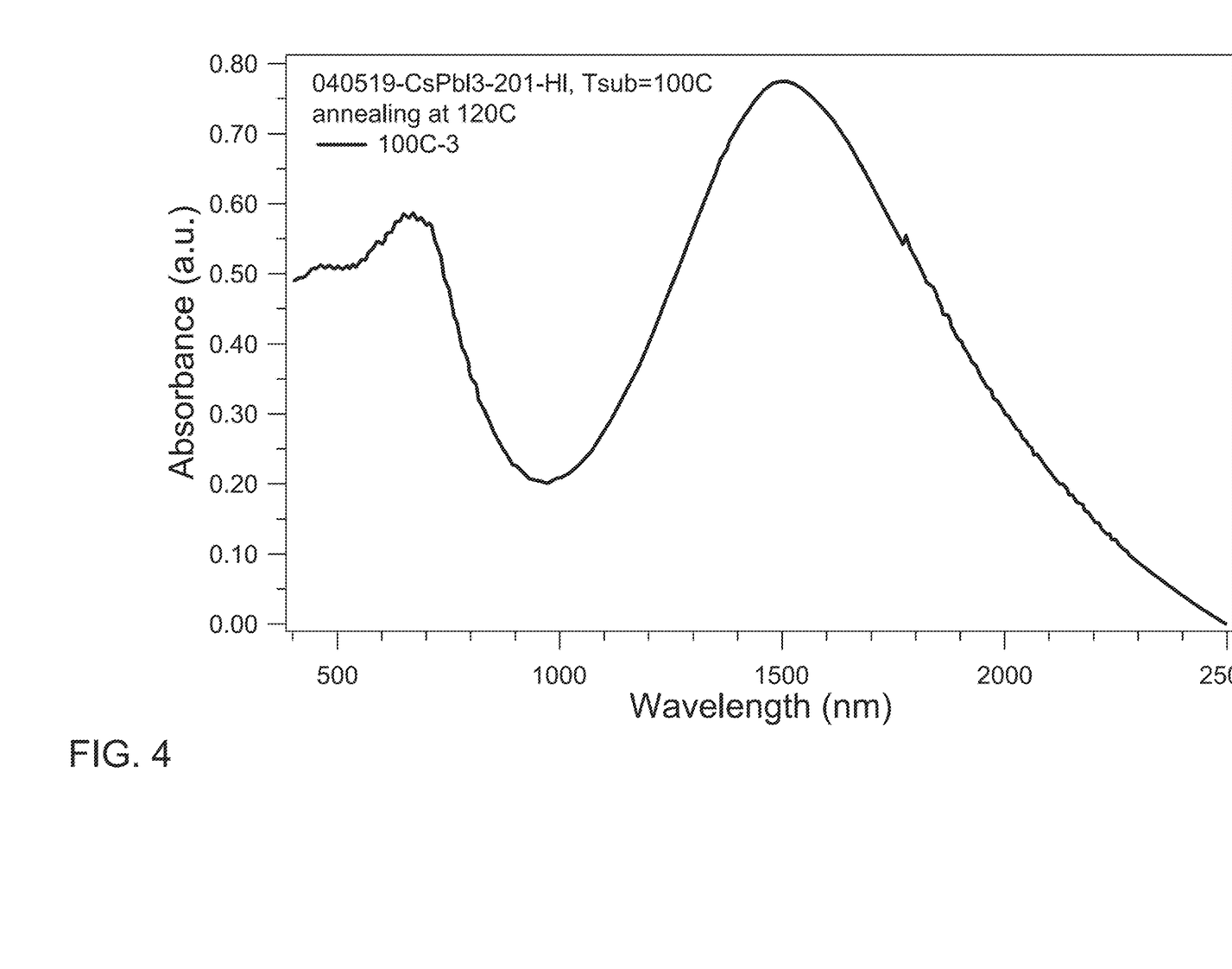
FIG. 4 shows the UV-Vis-NIR absorbance spectrum of a $CsPbI_3$ perovskite thin film from about 400-2500 nm.

FIG. 4 shows the UV-Vis-NIR absorbance spectrum of a $CsPbI_3$ perovskite thin film prepared in Example 1. The significant peak at 1520 nm shows that the material has a strong SWIR absorbance with a broad range from 1000 nm to 2500 nm, meanwhile, the small peak in the visible light range (near 600 nm) remains as a typical perovskite property.

Figure 5:
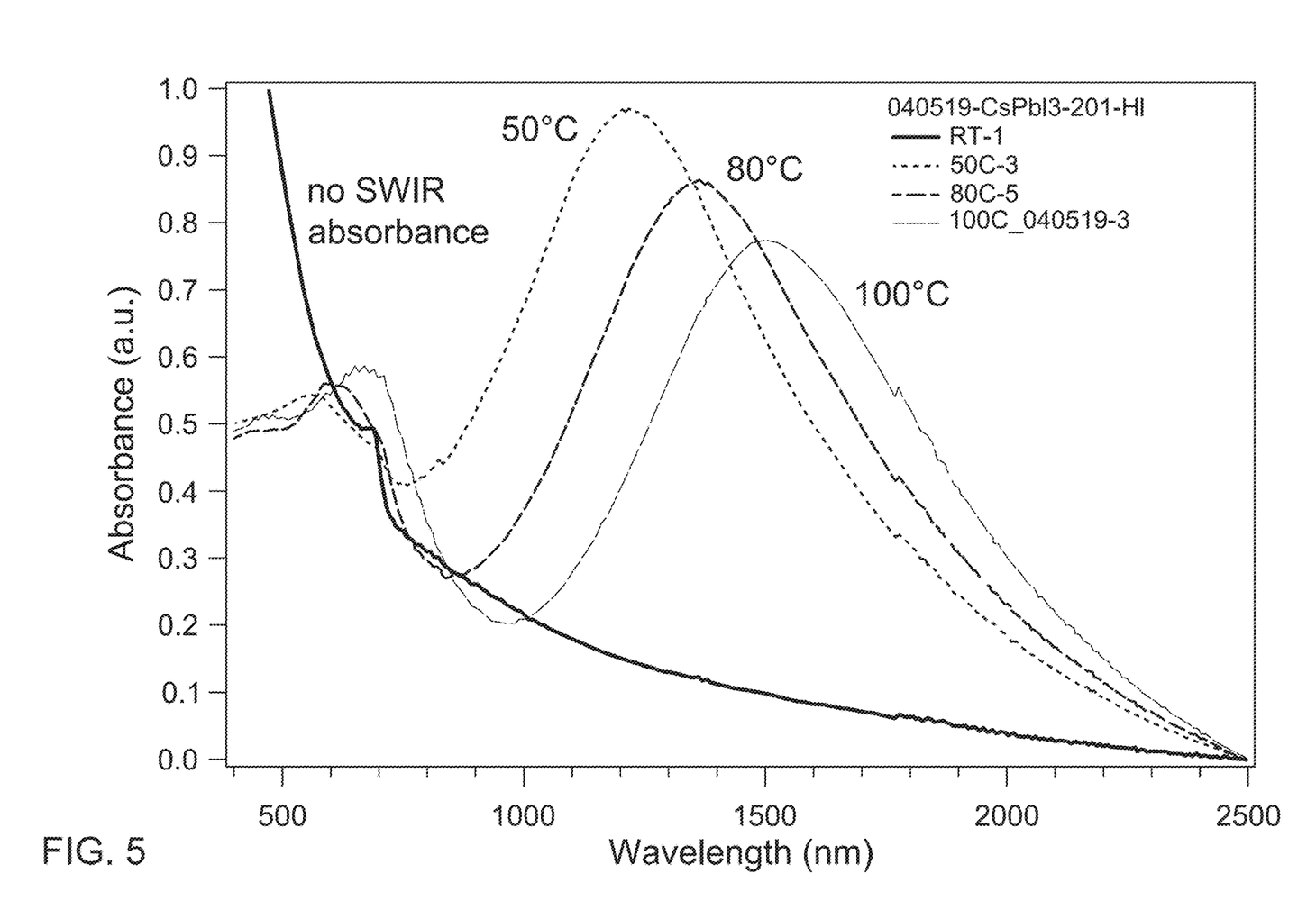
FIG. 5 shows tunable properties of all-inorganic perovskite materials prepared at different substrate temperatures. The SWIR absorbance shifts to higher wavelength as the substrate temperature increases, according to the methods of making perovskites disclosed herein. The peaks at 1520 nm, 1372 nm and 1230 nm correspond to thin films fabricated at substrate temperatures of 100° C., 80° C., and 50° C., respectively. The grey curve shows no SWIR absorbance, which belongs to the film fabricated on the same substrate at room temperature.

FIG. 5 shows the tunable properties of all-inorganic perovskite materials prepared at different substrate temperatures, according to the methods described above and in Example 1. The SWIR absorbance shifts to higher wavelength as the substrate temperature increases. The peaks at 1520 nm, 1372 nm and 1230 nm correspond to thin films fabricated at substrate temperatures of 100° C., 80° C., and 50° C., respectively. The grey curve shows no SWIR absorbance, which belongs to the film fabricated on the same substrate at room temperature. Thus, the methods disclosed herein enable tuning of the wavelength of maximum absorption in the resulting perovskite material. These fully inorganic materials are compositionally stable up to the melting point, which are in excess of 460° C. excess and thermally stable up to 200° C.

Figure 6:
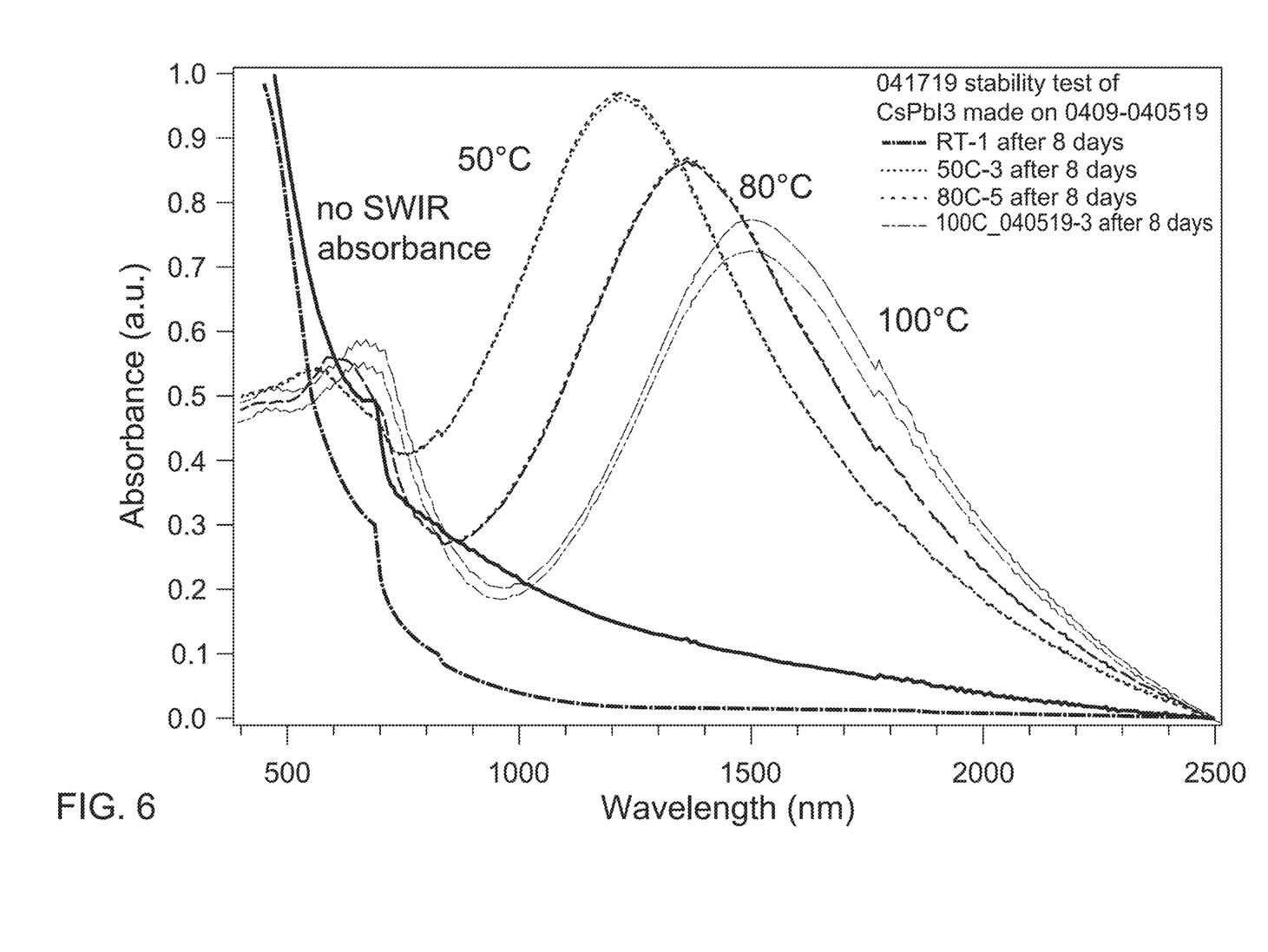
FIG. 6 shows the UV-Vis-NIR absorbance spectra of $CsPbI_3$ perovskite thin films after stored in ambient condition for 8 days. SWIR properties remain almost unchanged after 8 days, indicating stability of the materials disclosed herein.

FIG. 6 shows the UV-Vis-NIR absorbance spectra of $CsPbI_3$ perovskite thin films after storage in ambient conditions for 8 days, with the dotted spectra showing almost no change compared to the time-zero spectra shown in FIG. 5. Thus, the SWIR properties of the perovskites disclosed herein remain almost unchanged after 8 days. In FIG. 6, the solid curves (spectra) represent spectra of the fresh samples prepared at different substrate temperatures. The dashed curves indicate the UV-Vis-NIR properties of the samples after storage in air for 8 days. As shown in the graph, the SWIR absorbance range and the highest peaks are consistent between fresh samples and their corresponding aged samples, suggesting that the material has superior chemical stability at ambient conditions, and suggesting that the material has crystalline stability.

It should be understood that the perovskite crystal structures disclosed herein can refer to a double $A_2B'B''X_6$ or $A+_2B'^{3+}B''^{+}X^-_6$ perovskite wherein A+ is an organic or inorganic cation, $B'^{3+}$ is a trivalent organic or inorganic cation, $B''^{+}$ is a monovalent cation, and $X^-$ is a nonmetal or halogen anion. In some embodiments, the perovskite structures disclosed herein can also take the form of or replace an $A+B^{2+}X_3$ perovskite wherein A+ represents a cation, $B^{2+}$ represents a bivalent cation (e.g., lead), and X can represent a nonmetal or halogen anion. According to some aspects, an inorganic perovskite material having the general formula $A^+B^{2+}XY_2$ is disclosed herein, wherein: $A^+X$ is a first metal salt comprising A$^+$, a first monovalent alkali metal cation, and X, a first monovalent anion; and B$^{2+}$Y$_2$ is a second metal salt comprising B$^{2+}$, a second bivalent alkali earth metal, heavy metal, or transition metal cation, and Y$_2$, two second monovalent anions, and wherein the molar ratio of the first metal salt to the second metal salt is about 2:1.

According to some aspects, the methods and materials disclosed herein provide all-inorganic hybrid semiconductor materials comprising an intermediate-band (IB) strategy in which a wide optical gap is divided into a high-energy visible component and a low-energy IR (short-wave) component as demonstrated by FIGS. 4-6.

The methods disclosed herein enable thin film, large-area growth of perovskite materials by both solution-processing or dispersion of the precursor solution on a large area of substrate and physical vapor transport (e.g., annealing, temperature of the substrate) for the control of short-wave IR absorption (FIG. 5). In some embodiments, the fabrication methods disclosed herein can provide large-area sensors on flexible substrates.

According to some aspects, various solvents, stabilizers, and/or substrates can stabilize the perovskite structures disclosed herein. The data shown in FIG. 6 demonstrates formation of a stable perovskite structure capable of maintaining absorbance of SWIR light at ambient conditions over time. Depending on the starting materials utilized, the resulting perovskite structure can be an undistorted cubic structure, an orthorhombic structure, a tetragonal structure, or a trigonal structure.

The present disclosure is also directed to the perovskite materials made by the methods disclosed herein, devices comprising the perovskites, and methods of use. The methods of making perovskites disclosed herein are not limited by the exemplary embodiments disclosed herein. The methods and examples disclosed herein enable production of perovskites having stable crystal form (polymorph stability) and having stable chemical composition. The perovskites enabled herein can be utilized for solar cells, SWIR light detectors, various light emitting devices, cameras, calibration devices, and for other devices and applications.

According to some aspects, the perovskite materials disclosed herein may comprise one or more metal salts. The one or more metal salts may comprise one or more monovalent cations, one or more bivalent cations, or a combination thereof. Non-limiting examples of monovalent cations include cesium monovalent cations, silver monovalent cations, copper monovalent cations, and gold monovalent cations. Non-limiting examples of bivalent cations include alkali earth metal (e.g., beryllium, magnesium, calcium, strontium, barium, and radium) cations, heavy metal (e.g., mercury, cadmium, arsenic, chromium, thallium, and lead) cations, and transition metal cations. According to some aspects, the one or metal salts may further comprise one or more monovalent anions. Non-limiting examples of monovalent anions include Br—, Cl—, and I—.

As used herein, the term "about" is defined to being close to as understood by one of ordinary skill in the art. In one non-limiting embodiment, the term "about" is defined to be within 10%, preferably within 5%, more preferably within 1%, and most preferably within 0.5%.

An "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof. Examples of inert gases useful according to the present disclosure include, but are not limited to, gases comprising helium (He), radon (Rd), neon (Ne), argon (Ar), xenon (Xe), nitrogen (N), and combinations thereof.

A "reducing agent" is a substance that causes the reduction of another substance, while it itself is oxidized. Reduction refers to a gain of electron(s) by a chemical species, and oxidation refers to a loss of electron(s) by a chemical species.

"Alkali metal salts" are metal salts in which the metal ions are alkali metal ions, or metals in Group I of the periodic table of the elements, such as lithium, sodium, potassium, rubidium, cesium, or francium.

"Alkaline earth metal salts" are metal salts in which the metal ions are alkaline earth metal ions, or metals in Group II of the periodic table of the elements, such as beryllium, magnesium, calcium, strontium, barium, or radium.

"Transition metal salts" are metal salts in which the metal ions are transition metal ions, or metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium.

"Post-transition metal salts" are metal salts in which the metal ions are post-transition metal ions, such as gallium, indium, tin, thallium, lead, bismuth, or polonium.

As used herein, the terms "uniform", "uniform size", and "uniform shape" are defined as remaining the same in all cases and at all times; unchanging in form or character; provided the same reactants and same reaction conditions, with minimal or defined variation. An aspect ratio of a shape defined as the ratio of the length to the width or the ratio of the length to the height, a sphere having an aspect ratio of 1, with deviations from spherical shape demonstrated by an aspect ratio, either length/width or length/height, other than 1. The aspect ratio of the shapes described herein can be about 1±90%, 1±80%, 1±70%, 1±60%, 1±50%, 1±40%, 1±30%, 1±20%, 1±10%, 1±5%, 1±2.5, or 1±1%.

As used herein, the term "catalyst" refers to a component that directs, provokes, or speeds up a chemical reaction.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

This detailed description uses examples to present the disclosure, including the preferred aspects and variations, and also to enable any person skilled in the art to practice the disclosed aspects, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

As used herein, the terms "highly pure" and "high purity" are defined as about 98-100%, 99-100%, 99.9-100%, 99.99-100%, or 99.999%-100% pure.

Herein, the recitation of numerical ranges by endpoints (e.g. 50 mg to 600 mg, between about 100 and 500° C., between about 1 minute and 60 minutes) include all numbers subsumed within that range, for example, between about 20 minutes and 40 minutes includes 21, 22, 23, and 24 minutes as endpoints within the specified range. Thus, for example, ranges 22-36, 25-32, 23-29, etc. are also ranges with endpoints subsumed within the range 20-40 depending on the starting materials used, specific applications, specific embodiments, or limitations of the claims if needed. The Examples and methods disclosed herein demonstrate the recited ranges subsume every point within the ranges because different results or products can be derived after changing one or more reaction parameters. Further, the methods and Examples disclosed herein describe various aspects of the disclosed ranges and the effects if the ranges are changed individually or in combination with other recited ranges.

EXAMPLES

Cesium iodide (99.9%), lead iodide (99%) and anhydrous DMF (dimethylformamide) were purchased from Sigma-Aldrich. 1-(3-sulfopropyl) pyridinium hydroxide inner salt (98%, non-detergent sulfobetaine, NDSB 201) was purchased from TCI (Tokyo Chemical Industry Co., Ltd). All chemicals were used as received without further purification.

Example 1: $CsPbI_3$ Film Formation $PbI_2$ and CsI was dissolved in anhydrous DMF at a concentration of 0.5 M $PbI_2$ (231 mg/ml), $CsI/PbI_2$=2:1 (molar ratio) under stirring at 60-80° C. A 0.8% weight ratio of NDSB 201, 1-(3-sulfopropyl) pyridinium hydroxide inner salt (98%) to $CsPbI_3$ was added into the yellow solution of $CsPbI_3$ as stabilizer. The solution was kept at 60-80° C. during the whole procedure, and was spin-coated onto a hot glass film at different temperatures (less than 110° C. on hot plate) at 2000 rpm for 20 s, followed by annealing at 110-130° C. for 15 minutes under vacuum.

In addition, Cs can be replaced by any other inorganic or organic monovalent metal, Pb can be replaced by any other Bi-valent metal, I can be replaced by other monovalent nonmetal such as Br, Cl etc.

The UV and short-wave IR absorbance spectra were collected using a spectrophotometer (Varian Cary 5000 UV-Vis-NIR spectrometer) in the range of 300 nm-2500 nm. A field emission SEM (FEI Quanta 450 FEG) was used to investigate the surface morphology of the films.

What is claimed is:

1. An inorganic perovskite material having a formula of $A^+B^{2+}XY_2$ wherein:
   $A^+X$ is a first metal salt comprising: $A^+$, a first monovalent alkali metal cation, and X, a first monovalent anion; and
   $B^{2+}Y_2$ is a second metal salt comprising: $B^{2+}$, a second bivalent alkali earth metal, heavy metal, or transition metal cation, and $Y_2$, two second monovalent anions;
   wherein the inorganic perovskite material further comprises a stabilizer comprising 1-(3-sulfopropyl) pyridinium hydroxide inner salt, and
   wherein a molar ratio of the first metal salt to the second metal salt is about 2:1.

2. The inorganic perovskite material of claim 1, wherein the first metal salt is cesium iodide.

3. The inorganic perovskite material of claim 1, wherein the second metal salt is lead (II) iodide.

4. The inorganic perovskite material of claim 1, wherein the stabilizer is present at a weight ratio of about 0.8% compared to the combined weight of the first metal salt and the second metal salt.

5. The inorganic perovskite material of claim 1, wherein the first monovalent anion and/or the two second monovalent anions are Br—, Cl—, I—, or combinations thereof.

6. The inorganic perovskite material of claim 1, further comprising the inorganic perovskite material is a layer on a glass substrate; the glass substrate operative to stabilize the inorganic perovskite material.

7. The inorganic perovskite material of claim 6, wherein the inorganic perovskite material does not change in maximum wavelength of absorbance from 1000 nm to 2800 nm at ambient temperature for longer than about 8 days.

8. The inorganic perovskite material of claim 1, wherein the inorganic perovskite material has a highest SWIR absorbance between about 1000-2800 nm.

9. A method of making an inorganic perovskite material having a formula of $A^+B^{2+}XY_2$, comprising:
   preparing a precursor solution in a solvent by:
      dissolving a first metal salt containing a first monovalent alkali metal cation, $A^+$, and a first monovalent anion, X, in the solvent;
      dissolving an second metal salt containing a second bivalent alkali earth metal, heavy metal, or transition metal cation, $B^{2+}$, and two second monovalent anions, $Y_2$, in the solvent,
      wherein a molar ratio of the first metal salt to the second metal salt is about 2:1 in the solvent;
   adding a stabilizer to the precursor solution;
   dispersing the precursor solution on a substrate; and
   annealing the dispersed precursor solution on the substrate at an annealing temperature from 40-300° C., to form an inorganic perovskite material,
   wherein the stabilizer comprises 1-(3-sulfopropyl) pyridinium hydroxide inner salt.

10. The method of claim 9, wherein annealing is done in a vacuum.

11. The method of claim 9, wherein the preparing a precursor solution in a solvent is at a temperature from 60-80° C. and wherein dispersing the precursor solution on a substrate is at less than 110° C.

12. The method of claim 9, wherein the first metal salt is cesium iodide and the second metal salt is lead (II) iodide.

13. The method of claim 12, wherein the annealing temperature is about 50° C. and wherein the inorganic perovskite material is operative to have a maximum SWIR absorbance at about 1200 nm.

14. The method of claim 12, wherein the annealing temperature is about 80° C. and wherein the inorganic perovskite material is operative to have a maximum SWIR absorbance at about 1400 nm.

15. The method of claim 12, wherein the annealing temperature is about 100° C. and wherein the inorganic perovskite material is operative to have a maximum SWIR absorbance at about 1500 nm.

16. The method of claim 9, further comprising wherein the annealing temperature is operative to determine the wavelength of maximum SWIR absorbance of the inorganic perovskite material.

17. The method of claim 9, wherein the solvent is dimethylformamide.

18. The method of claim 9, wherein dispersing the precursor solution on a substrate is done by spin coating the precursor solution on the substrate.

19. The method of claim 9, wherein the substrate is glass and the glass is operative to stabilize the inorganic perovskite material at ambient temperature.

* * * * *